(12) United States Patent
Hahm

(10) Patent No.: US 6,394,214 B1
(45) Date of Patent: May 28, 2002

(54) MOTORCYCLE FORWARD SHIFT CONTROL

(76) Inventor: Scott W. Hahm, 10570 Robinwood Ct., Cedarburg, WI (US) 53012

( * ) Notice: Subject to any disclaimer, the term of this patent is extended or adjusted under 35 U.S.C. 154(b) by 0 days.

(21) Appl. No.: 09/656,003

(22) Filed: Sep. 6, 2000

(51) Int. Cl.$^7$ ................................................ B62M 3/00
(52) U.S. Cl. .................................... 180/230; 74/473.16
(58) Field of Search ................................. 180/219, 230, 180/336; 74/473.16, 473.17, 478, 478.5, 512

(56) References Cited

U.S. PATENT DOCUMENTS

| | | |
|---|---|---|
| 2,600,767 A | 6/1952 | Herrell |
| 3,935,916 A * | 2/1976 | Ferraro |
| 3,964,564 A | 6/1976 | Pittarelli |
| 4,741,222 A * | 5/1988 | Berndt |
| 5,299,652 A | 4/1994 | Bevins |
| 5,507,200 A | 4/1996 | Reed et al. |
| 5,661,999 A | 9/1997 | Carone |
| 5,662,195 A * | 9/1997 | Rush |
| 6,042,171 A | 3/2000 | Hesse |

* cited by examiner

Primary Examiner—Kevin Hurley
(74) Attorney, Agent, or Firm—Andrus, Sceales, Starke & Sawall, LLP

(57) ABSTRACT

A motorcycle shifting arrangement is connected to the transmission of the motorcycle for shifting the transmission between a higher gear and a lower gear. The motorcycle includes an original shifting structure having an original shift pedal pivotally mounted on an original pivot shaft coupled to the transmission at a location adjacent a foot rest attached to a bottom portion of the motorcycle. A supplementary shifting structure is constructed and arranged to permit alternative shifting of the motorcycle while the motorcycle operator has his or her legs in a raised, extended position resting upon a highway peg attached to a supporting structure at a forward location of the motorcycle.

12 Claims, 2 Drawing Sheets

MOTORCYCLE FORWARD SHIFT CONTROL

This invention relates broadly to motorcycles and, more particularly, pertains to a transmission forward shift control which allows for greater flexibility and comfort in shifting gears in use with motorcycles.

BACKGROUND OF THE INVENTION

Motorcycles are designed with a transmission and a foot pedal mechanism that is disposed on one side, usually the left side, of the motorcycle. The foot pedal is coupled through a pivoting arrangement to a rod which, in turn, is connected to the transmission to move the gears up for acceleration and down for deceleration. Prior art motorcycles include a foot rest in the form of a foot peg, a foot plate or floor board upon which the sole of an operator's boot or the shoe of an operator's left foot rests during travel. At least one shift lever or pedal is associated with and generally located forwardly of the foot rest, the shift pedal being engageable by the toe of the foot for shifting. Some motorcycles also include a second shift lever or pedal located generally rearwardly of the foot rest and engageable with the heel of the foot.

As is well known, to accelerate the motorcycle, the boot or shoe is positioned under the shift lever, and with the foot resting on the foot rest, the toe is moved upwardly each time an upward shift is desired by forcing the shift pedal upwardly and moving the shift rod accordingly. To decelerate or come to a stop, the left foot must be disengaged from the foot rest so that the operator's sole is placed on top of the shift pedal at which position the motorcycle may be shifted downwardly by applying an appropriate downward force.

In recent years, it has become a desired practice among motorcycle enthusiasts to convert stock motorcycle transmission arrangements to forward shift controls in which an operator may have his or her legs extended forwardly, upwardly and outwardly in a rest position supported on highway pegs and still have the ability to shift the gears of the motorcycle transmission without having to relocate the shifting foot. A properly installed forward shift control must provide some measure of adjustability so as to be usable according to the operator's individual leg length and preferred riding position during extended travel. However, such conversion arrangements generally require modification of the basic motorcycle control system such that the original shifting hardware must be removed before the forward shift controls may be added. In the case of newly manufactured motorcycles which are ordered with forward shift controls, the standard shifting pedal and lever are generally not included.

Accordingly, it is desirable that the present invention provide a forward shift control which supplements the original shift pedal and lever system in a manner which will permit shifting of the motorcycle from the original foot rest as well as from one of the highway pegs.

SUMMARY OF THE INVENTION

It is a general object of the present invention to provide a more versatile motorcycle shifting arrangement which permits the operator to change gears while his or her legs are in an extended, raised position.

It is one object of the present invention to provide a shifting linkage which may be easily installed between a support structure on the forward portion of the motorcycle and the pivoting arrangement of the original foot pedal mechanism.

It is also an object of the present invention to provide a forward shift control employing a highway peg which may be adjustably positioned relative to the original foot pedal mechanism.

It is a further object of the present invention to provide an articulated motorcycle forward shift control that includes a primary shift lever secured to the pivoting arrangement of the original foot pedal mechanism, a secondary shift lever carrying a highway peg which is connected to a supporting structure on the motorcycle and a linkage interconnecting the primary and secondary shift levers.

It is an additional object of the present invention to provide a motorcycle forward shift control which can be installed on a motorcycle as original equipment or may be added to a motorcycle at a date following original manufacture.

In one aspect of the invention, a motorcycle shifting arrangement is connected to the transmission of a motorcycle for shifting the transmission between a higher gear and a lower gear. The motorcycle includes an original shifting structure having an original shift pedal pivotally mounted on an original pivot shaft coupled to the transmission at a location adjacent a foot rest attached to a bottom portion of the motorcycle. The improvement includes a supplemental shifting structure constructed and arranged to permit alternative shifting of the motorcycle while the motorcycle operator has his or her legs in a raised, extended position resting upon a highway peg attached to a supporting structure at a forward location on the motorcycle.

In another aspect of the invention, a motorcycle shifting arrangement is connected to the transmission of a motorcycle to shift the transmission between higher and lower gears. The shifting arrangement includes an original shift pedal pivotally mounted on an original pivot shaft coupled to the transmission at a location adjacent a foot rest attached to the bottom portion of the motorcycle. A primary shift lever is pivotally connected to the original pivot shaft. A secondary shift lever is pivotally connected to a supporting structure of the motorcycle. A secondary shift lever includes a foot pedal and a highway peg upon which a motorcycle operator rests his or her foot with his or her legs in an extended, raised position relative to the foot rest. A connecting linkage has one end pivotally connected to the primary shift lever and another end pivotally connected to the secondary shift lever. With this construction, the motorcycle operator, with his or her foot resting upon the highway peg, engages the foot pedal with his or her toe to shift to a higher gear and engages the original shift pedal with his or her heel to shift to a lower gear. The primary shift lever, the secondary shift lever and the connecting linkage are installed on the motorcycle without modification of the original shift pedal and the original pivot shaft.

In yet another aspect of the invention, a motorcycle forward shift control is connected to the transmission of a motorcycle to shift the transmission between a higher gear and a lower gear. The motorcycle includes an original shift pedal pivotally mounted on an original pivot shaft coupled to the transmission at a location adjacent a foot rest attached to the motorcycle. The forward shift control includes a primary shift lever having an upper end and a lower end pivotally connected to the original pivot shaft. A secondary shift lever is pivotally connected to a supporting structure of the motorcycle. The secondary shift lever includes an upper segment provided with a foot pedal, a lower segment having a series of adjustment openings and a medial hub having an elongated pivot shaft for mounting a highway peg upon which a motorcycle operator rests his or her foot in an extended, raised position relative to the foot rest. A connecting linkage has a forward heim joint pivotally connected to the lower segment of the secondary shift lever at a selected one of the adjustment openings, and a rearward heim joint pivotally connected to the upper end of the primary shift lever. The motorcycle operator with his or her foot resting on the highway peg is able to apply a force with the bottom of his or her toe against the foot pedal which will pivot the secondary shift lever causing movement of the connecting linkage to rotate the primary shift lever about the original pivot shaft and cause shifting to a higher gear, and is able to apply a force with the bottom of his or her heel against the original shift pedal which will rotate the original shift lever and cause shifting to a lower gear. The supporting structure is a roll bar and the highway peg is adjustably mounted on the roll bar. The secondary shift lever is a one-piece construction formed with an obtuse angle. The elongated pivot shaft is surrounded by sleeve structure such that the medial hub is rotatable relative to the highway peg. The connecting linkage includes a rod having a longitudinal axis and opposite threaded ends, and the forward and rearward heim joints each include an internally threaded sleeve for receiving one of the threaded ends of the rod, and an apertured rod end having a swivel joint between. The forward heim joint and the rearward heim joint are rotatable about a horizontal axis as well as the longitudinal axis of the rod. The foot pedal, the highway peg and the original shift pedal are in alignment with each other. The original pivot shaft carries a plurality of spacers for positioning the primary shift lever between the motorcycle and the original shift lever. The highway peg is constructed of a cylindrical body surrounded by a series of non-slip surfaces. The sleeve structure and the cylindrical body of the highway peg are concentrically mounted about the axis of the elongated pivot shaft.

Various other objects, features and advantages of the invention will be made apparent from the following description taken together with the drawings.

BRIEF DESCRIPTION OF THE SEVERAL VIEWS OF THE DRAWINGS

The drawings illustrate the best mode presently contemplated of carrying out the invention.

In the drawings:

FIG. 4 is a cross sectional view taken on line 4—4 FIG. 2.

DETAILED DESCRIPTION OF THE PREFERRED EMBODIMENT

Figure 1:
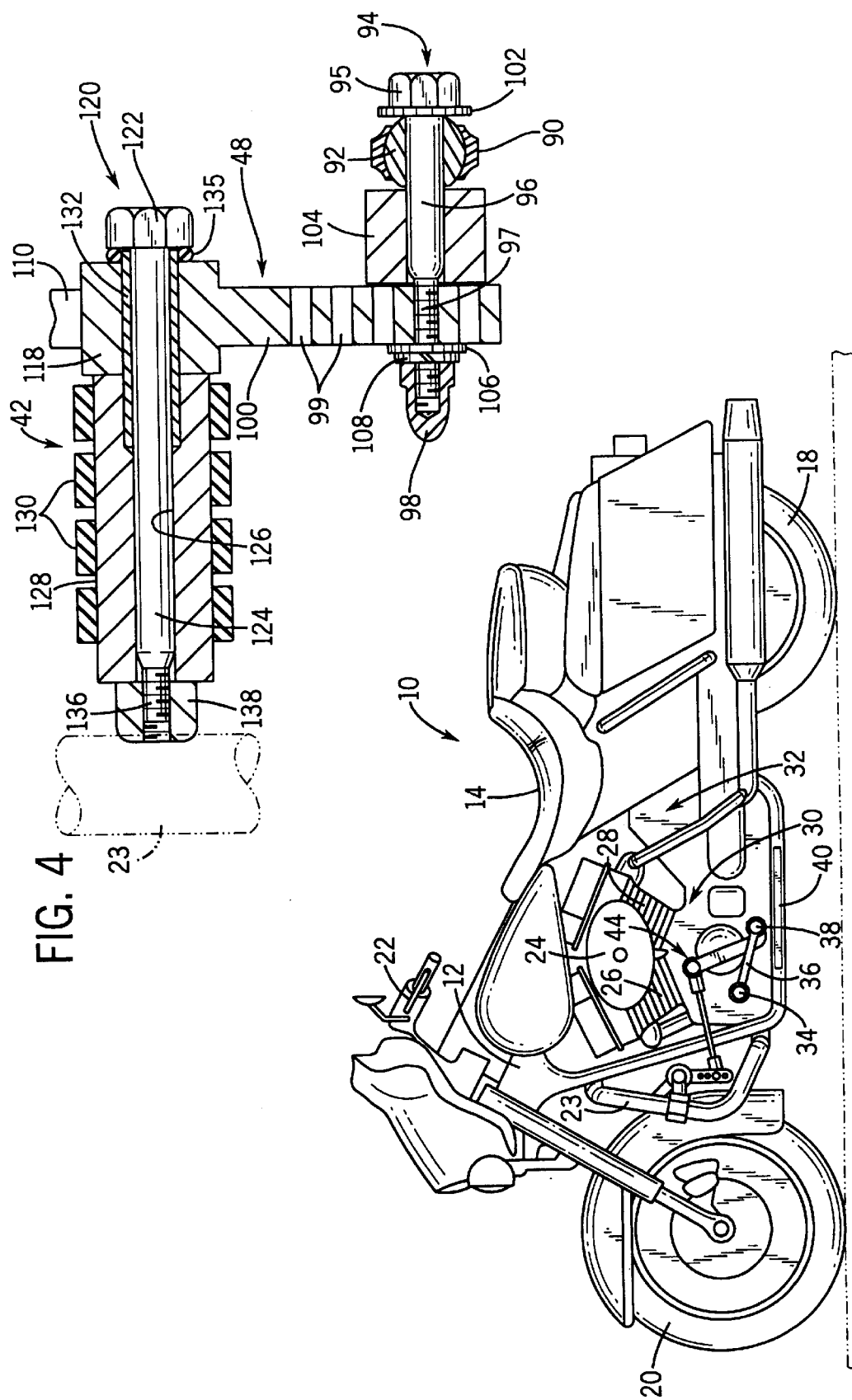
FIG. 1 is an elevational view of a motorcycle equipped with the forward shift control embodying the present invention.

Referring now the drawings, FIG. 1 illustrates a conventional motorcycle 10 having a frame 12, a seat area 14, a fuel tank 16, a non-steerable rear wheel 18 and a front wheel 20 which is steerable by means of a handlebar 22. A protective and/or reinforcing supporting structure in the form of a crash or roll bar 23 is attached to the forward portion of the frame 12.

Mounted within the frame 12 is a conventional internal combustion engine 24 comprising at least two cylinders 26, 28 at the bottom of which is a belt drive housing 30. A conventional transmission 32 is associated with the belt drive housing 30 to cause movement of the motorcycle 10. The transmission gearing of multiple gears is controlled through a clutch (not shown) located on the handlebar 22 so that shifting may occur through downward or upward foot pressure on a conventional shift peg 34 attached at the distal end of an offset lever 36. As is well known, the lever 36 is clamped or otherwise secured to a pivot shaft 38 extending laterally from the motorcycle 10 and connected by appropriate linkage (not shown) to a shift rod (not shown) which, in turn, is coupled to the transmission 32 to ratchet the gears upward for acceleration and down for deceleration. In the conventional shifter, there is also a foot rest in the form of a floor board or foot plate 40 which is attached to the left side of the motorcycle 10 in alignment with and behind the shift peg 34. With this type of conventional shifting mechanism, an operator engages the toe of his or her foot under the shift peg 34 to move it upwardly to upshift, and then must reposition the foot so that the toe is on top of the shift peg 34 to press downward and downshift. It is recognized that repeated upward movement of the toe is awkward and may cause discomfort to the foot and ankle and that the operator is better disposed to press the shift peg 34 downwardly. Some motorcycles conventionally include another shift lever and shift peg which is engageable with the heel of the foot at the rear of the floorboard 40.

At this point, it should be appreciated that many motorcycles include a set of laterally extending highway pegs (one being shown at 42) which are attached to the frame 12 or a supporting structure thereof at a location generally forwardly and upwardly of the floor board 40 to enable the operator to ride with his or her legs in a relaxed, raised position during extended periods of travel. It is the purpose of the present invention to provide a unique supplementary shifting structure or forward shift control 44 which enables foot shifting of the transmission 32 from the highway peg 42 or the floor board 40.

Figure 2:
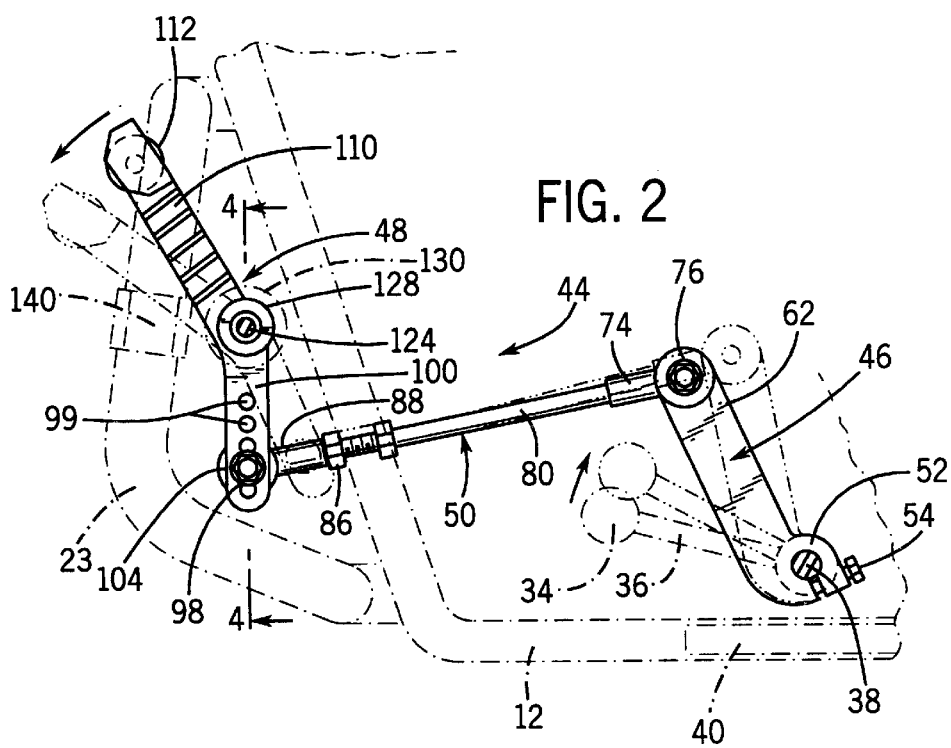
FIG. 2 is an enlarged, fragmentary view of the forward shift control showing its relative movement in phantom and solid lines.
Figure 3:
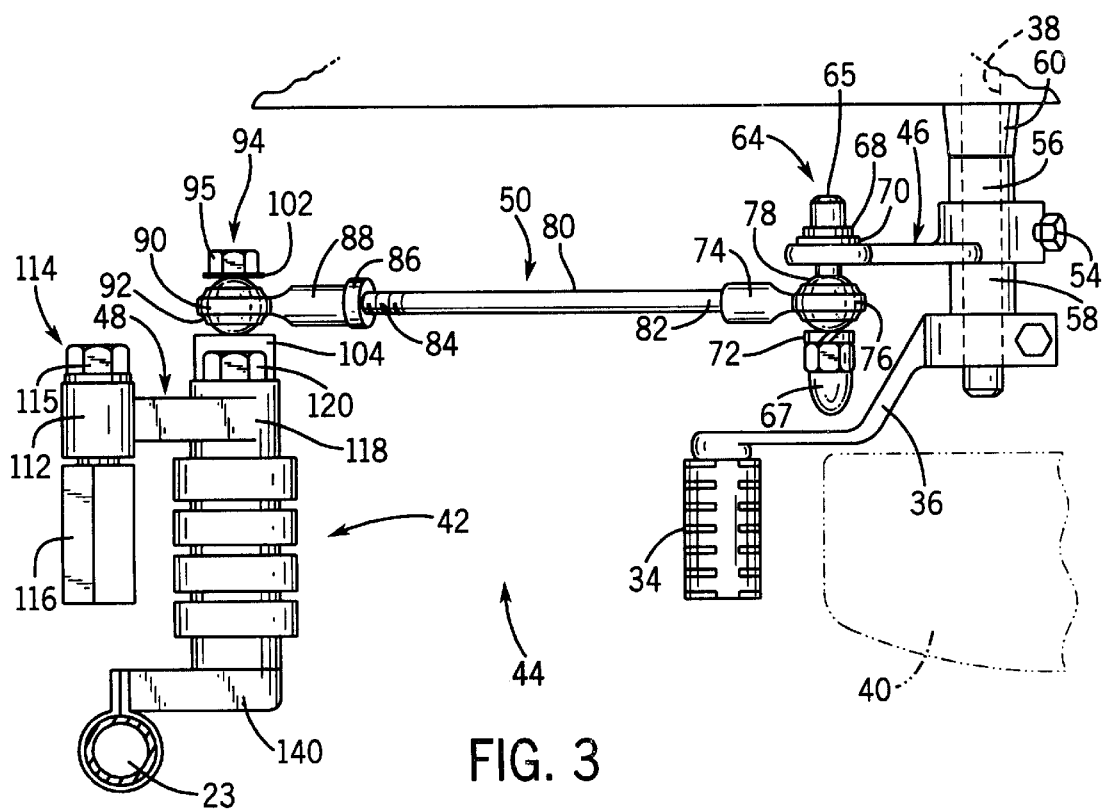
FIG. 3 is a plan view of the forward shift control shown in FIG. 2.

Referring now to FIGS. 2–4, the forward shift control 44 is comprised of a primary shift lever 46, a secondary shift lever 48, and an adjustable linkage 50 interconnecting the primary and secondary shift levers 46, 48.

Primary shift lever 46 has a lower split end 52 which is clamped, such as by fastener 54, to the pivot shaft 38 between a pair of spacing collars 56, 58 encircling the shaft 38. An additional spacing collar 60 surrounds the shaft 38 immediately adjacent the left side of the motorcycle 10. The primary shift lever 46 has an upper end 62 which is apertured to receive a first bolt 64 having a head 65 and a shaft 66 with a threaded end which is engaged with a first nut 67. On one side of the primary shift lever upper end 62 is a pair of washers 68, 70 mounted to the bolt shaft 66 while on the other side of the upper end 62 is the rearward end of linkage 50, a lock washer 72 and nut 67 mounted on the bolt 64. More specifically, the rearward end of linkage 50 includes a rearward heim joint having an internally threaded sleeve 74 integrally formed with an apertured rod end 76 in which one apertured swivel or ball joint 78 is movably retained on and with respect to bolt 64. An elongated rod 80 has a threaded rear end 82 which is screwed into the sleeve 74, and a threaded front end 84 which is screwed into a front heim joint having a nut 86 and an internally threaded sleeve 88. Like sleeve 74, sleeve 88 is integrally formed with an apertured rod end 90 in which another apertured swivel joint 92 is pivotally retained on a second bolt 94 having a head 95 and a shaft 96 with threaded end 97 engaged with a second nut 98. As seen in FIG. 4, the threaded 97 of the bolt 94 passes through a selected one of several aligned openings 99 formed in a lower segment 100 of the shift lever 48. A washer 102 is mounted on the shaft 96 between the head 95 and one side of the rod end 90. A cylindrical spacer 104 is mounted on the shaft 96 between the other side of the rod end 90 and one side of the lower segment 100. Another washer 106 and a lock washer 108 encircle the threaded end 97 of bolt 94 between the nut 98 and the other side of the lower segment 100.

The one piece, secondary shift lever 48 has an upper segment 110 which extends upwardly and forwardly of the lower segment 100 at a generally obtuse angle. The upper end of upper segment is formed with a hub 112 having an aperture for receiving a bolt 114 having a head 115 and a threaded end upon which a foot pedal 116 is attached. Interposed between the respective lower and upper segments 100, 110 is a medial hub 118 provided with an aperture for accommodating a bolt 120 having a head 122 and elongated shaft 124. The shaft 124 passes through a central opening 126 formed in a cylindrical body 128 of highway peg 42. A group of four spaced apart, non-slip rings 130 are fixedly mounted around the outer periphery of the body 128 and provide a secure resting and a support surface for the left boot of the operator when his or her legs are in the raised, extended travel position. The shaft 124 passes through a sleeve 132 which extends through aligned apertures in the hub 118 and the body 128. Because of the sleeve 132, the secondary shift lever 48 is pivotable about the shaft 124 when a force is applied to the foot pedal 116. A flexible O-ring 135 encircles the end of sleeve 134 between hub 118 and the bolt head 122. The shaft 124 has a threaded end 136 which protrudes from body 128 and is engaged by a nut 138. A bracket 140 extends between the roll bar 23 and the distal end of the highway peg 42. The bracket 140 is adjustable along a vertical extent of the roll bar 23 so as to accommodate the preferred positioning of the highway peg 42 for the particular operator during extended road travel.

In the aforedescribed forward shift control 44, it should be appreciated that (as seen best in FIG. 3) the original shift pedal 34, the highway peg 42 and the foot pedal 116 are all operatively alignable with each other. Also, the upper segment 110 of secondary shift lever 48 is suitably dimensioned such that when the sole of the operator's boot is supported on highway peg 42, the toe of the boot will be closely engageable on top of the foot pedal 116 and the heel of the boot will be closely engageable upon the original shift pedal 34. Rod 80 may be suitably and simply screwed by hand into or out of one or both sleeves 74, 88, and the bolt shaft 96 is inserted through the proper opening 99 in lower segment 100 to properly set the linkage 50 for the particular geometry of the motorcycle design. It should also be fully understood that the swivel joints 78, 92 of the front and rear heim joints enable the linkage 50 to rotate about the longitudinal axis of the rod 80 so that the linkage 50 is self-aligning at all times. It is also important to realize that the split end 52 of the primary shift lever 46 is favorably positioned on the original transmission pivot shaft 38 between the left side of the motorcycle 10 and the original shift lever 36.

One of the foremost advantages of the present invention is that the forward shift control 44 provides an additional or supplemental transmission shifting capability from the highway peg 42 without altering or eliminating the original shift assembly 34, 36, 38 adjacent the floor board 40. Because the original shift structure stays intact and does not require modification or removal, installation of the forward shift control 44 is made easier and more quickly than prior art designs.

In use, with the forward shift control 44 installed as set forth above, the motorcycle operator will have the sole of his or her left foot resting on the highway peg 42 during desired periods of travel. When it is desired to accelerate or upshift, the toe of the operator's boot pushes downwardly and forwardly in the direction of the arrow A in FIG. 2. This pivots the secondary shift lever 48 to the phantom line position, moves the linkage 50 rearwardly and transfers the primary shift lever 46 rearwardly to its phantom line position. The resulting movement is clockwise motion of original pivot shaft 38 so that the gears and transmission 32 will ratchet up. Original shift pedal 34 and shift lever 36 moves upwardly in the direction of the arrow B.

When it is desired to decelerate or downshift, the boot is positioned such that the heel of the operator's boot applies a downward force in the direction opposite arrow B on original shift pedal 34. This, in turn, rotates the original pivot shaft 38 counterclockwise so as to ratchet the gears in transmission 32 down. At any time, shifting as originally intended may also be accomplished from the floor board 40 by engaging the toe of the boot under the shift pedal for upshifting and engaging the toe of the boot on top of the shift pedal 34 for downshifting.

The adjustable features of the forward shift control 44 enable the present invention to be installed on several different makes and models of motorcycles. The forward shift control relies upon easier applied downward forces to execute upward and downward shifting of gears.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with the following claims.

I claim:

1. In a motorcycle shifting arrangement connected to the transmission of a motorcycle for shifting the transmission between a higher gear and a lower gear wherein the motorcycle includes an original shifting structure having an original shift pedal pivotally mounted on an original pivot shaft coupled to the transmission at a location adjacent a foot rest attached to a bottom portion of the motorcycle, the improvement comprising:

a supplemental shifting structure constructed and arranged to permit alternative shifting of the motorcycle while the motorcycle operator has his or her legs in a raised, extended position resting upon a highway peg attached to a supporting structure at a forward location on the motorcycle and without modification of the original shaft pedal and the original pivot shaft.

2. A motorcycle shifting arrangement connected to the transmission of a motorcycle to shift the transmission between higher and lower gears, the shifting arrangement comprising:

an original shift pedal pivotally mounted on an original pivot shaft coupled to the transmission at a location adjacent a foot rest attached to a bottom portion of the motorcycle;

a primary shift lever pivotally connected to the original pivot shaft;

a secondary shift lever pivotally connected to the supporting structure of the motorcycle, the secondary shift lever including a foot pedal and a highway peg upon which a motorcycle operator rests his or her foot with his or her legs in an extended, raised position relative to the foot rest; and a connecting linkage having one end pivotally connected to the primary shift lever and another end pivotally connected to the secondary shift lever, whereby the motorcycle operator with his or her foot resting upon the highway peg engages the foot pedal with his or her toe to shift to a higher gear, and engages the original shift pedal with his or her heel to shift to a lower gear, and whereby the primary shift lever, the secondary shift lever and the connecting linkage are installed on the motorcycle without modification of the original shift pedal and the original pivot shaft.

3. A motorcycle forward shift control which is converted to the transmission of a motorcycle to shift the transmission between a higher gear and a lower gear wherein the motorcycle includes an original shift pedal pivotally mounted on an original pivot shaft coupled to the transmission at a location adjacent a foot rest attached to the motorcycle, the forward shift control comprising:

a primary shift lever having an upper end and a lower end pivotally connected to the original pivot shaft;

a secondary shift lever pivotally connected to a supporting structure of the motorcycle, the secondary shift lever including an upper segment provided with a foot pedal, a lower segment having a series of adjustment openings, and a medial hub having an elongated pivot shaft for mounting a highway peg upon which a motorcycle operator rests his or her foot in an extended, raised position relative to the foot rest; and a connecting linkage having a forward heim joint pivotally connected to the lower segment of the secondary shift lever at a selected one of the adjustment openings, and a rearward heim joint pivotally connected to the upper end of the primary shift lever, whereby the motorcycle operator with his or her foot resting on the highway peg is able to apply a force with the bottom of his or her toe against the foot pedal which will pivot the secondary shift lever causing movement of the connecting linkage to rotate the primary shift lever about the original pivot shift and cause shifting to a higher gear, and is able to apply a force with the bottom of his or her heel against the original shift pedal which will rotate the original shift lever and cause shifting to a lower gear.

4. The forward shift control of claim 3, wherein the supporting structure is a roll bar, and the highway peg is adjustably mounted on the roll bar.

5. The forward shift control of claim 3, wherein the secondary shift lever is a one piece construction formed with an obtuse angle.

6. The forward shift control of claim 3, wherein the elongated pivot shaft is surrounded by sleeve structure such that the medial hub is rotatable relative to the highway peg.

7. The forward shift control of claim 3, wherein the connecting linkage includes a rod having a longitudinal axis and opposite threaded ends, and the forward and rearward heim joints each include an internally threaded sleeve for receiving one of the threaded ends of the rod, and an apertured rod end having a swivel joint therein.

8. The forward shift control of claim 7, wherein the forward heim joint and the rearward heim joint are rotatable about a horizontal axis as well as the longitudinal axis of the rod.

9. The forward shift control of claim 3, wherein the foot pedal, the highway peg and the original shift pedal are alignable with one another.

10. The forward shift control of claim 3, wherein the original pivot shaft carries a plurality of spacers for positioning the primary shift lever between the motorcycle and the original shift lever.

11. The forward shift control of claim 6, wherein the highway peg is comprised of a cylindrical body surrounded by a series of non-slip surfaces.

12. The forward shift control of claim 11, wherein the sleeve structure and the cylindrical body of the highway peg are concentrically mounted about the axis of the elongated pivot shaft.

* * * * *